(12) United States Patent
Cho

(10) Patent No.: US 6,972,982 B2
(45) Date of Patent: Dec. 6, 2005

(54) RING-SHAPED PRISM OF A HOLOGRAPHIC ROM SYSTEM

(75) Inventor: Jang Hyun Cho, Seoul (KR)

(73) Assignee: Daewoo Electronics Corporation, (KR)

( * ) Notice: Subject to any disclaimer, the term of this patent is extended or adjusted under 35 U.S.C. 154(b) by 93 days.

(21) Appl. No.: 10/678,196

(22) Filed: Oct. 2, 2003

(65) Prior Publication Data

US 2004/0190358 A1    Sep. 30, 2004

(30) Foreign Application Priority Data

Mar. 31, 2003  (KR) .................. 10-2003-0019975

(51) Int. Cl.⁷ ............................................. G11C 13/04
(52) U.S. Cl. ..................... 365/125; 365/10; 365/11; 369/103; 369/112.28
(58) Field of Search .................. 365/222, 125, 365/10, 11; 359/125, 10, 11; 369/103, 112.28

(56) References Cited

U.S. PATENT DOCUMENTS

| | | | |
|---|---|---|---|
| 3,742,464 A * | 6/1973 | Rajchman et al. | 340/173 |
| 3,914,129 A * | 10/1975 | Wylot et al. | 106/47 |
| 5,322,747 A | 6/1994 | Hugle | |
| 6,418,106 B1 | 7/2002 | Stoll | |
| 2003/0161246 A1 * | 8/2003 | Chuang | 369/103 |
| 2004/0218239 A1 * | 11/2004 | Roh | 359/10 |

FOREIGN PATENT DOCUMENTS

| EP | 0271300 | 6/1988 |
|---|---|---|
| JP | XP-002318686 | 2/2003 |

\* cited by examiner

*Primary Examiner*—Connie C. Yoha
(74) *Attorney, Agent, or Firm*—Anderson Kill & Olick, PC

(57) ABSTRACT

A holographic system for storing data on an interference pattern in a hologram storage medium includes a light source for emitting a laser beam, a beam splitter, modulating means and a refractive material. The beam splitter divides the laser beam into a reference beam and a signal beam and the modulating means modulates the signal beam to generate a modulated signal beam. The refractive material refracts the reference beam to generate a refracted reference beam, wherein the refracted reference beam interferes with the modulated signal beam in the hologram storage medium to generate the interference pattern.

5 Claims, 4 Drawing Sheets

RING-SHAPED PRISM OF A HOLOGRAPHIC ROM SYSTEM

FIELD OF THE INVENTION

The present invention relates to a holographic ROM (Read-Only Memory) system; and, more particularly, to a ring-shaped prism, whose refractive index may be adjusted to enhance recording and reading efficiency, of the holographic ROM system.

BACKGROUND OF THE INVENTION

A conventional holographic memory system stores information on an interference pattern of a signal beam and a reference beam in a hologram storage medium, which is sensitive to an amplitude of the interference pattern. The conventional holographic memory system normally employs a page-oriented storage approach. An input device such as an SLM (spatial light modulator) presents recording data in a form of a two-dimensional array (referred to as a page), while a detector array such as a CCD camera is used to retrieve the recorded data page upon readout. Other architectures have also been proposed wherein a bit-by-bit recording is employed in lieu of the page-oriented approach. All of these systems, however, suffer from a common drawback requiring recording of a huge number of separate holograms in order to fill the memory to capacity. A typical page-oriented system using a megabit-sized array would require recording of hundreds and thousands of hologram pages to reach the capacity of 100 GB or more. Even with a hologram exposure time of millisecond-order, the total recording time required for filling a 100 GB-order memory may easily amount to at least several tens of minutes, if not an hour. Thus, another conventional holographic ROM (Read-Only Memory) system as shown in FIG. 1A has been developed, where the time required to produce a 100 GB-order capacity disc may be reduced to under a minute, and potentially to an order of seconds.

The conventional holographic ROM system of FIG. 1A includes a light source 100, a first and a second half wave plate (HWP) 102 and 112, an expanding unit 104, a polarization beam splitter (PBS) 106, polarizers 108 and 114, mirrors 110, 116 and 116', a hologram storage medium 120, a mask 122 and a conical mirror 118.

The light source 100 emits a laser beam of a constant wavelength, e.g., a wavelength of 532 nm. The laser beam, of only one type of linear polarization, e.g., P-polarization or S-polarization, is provided to the HWP 102. The HWP 102 rotates the polarization of the laser beam by θ degree (preferably 45°). And then, the polarization-rotated laser beam is fed to the expanding unit 104 for expanding the beam size of the laser beam to a predetermined size. Thereafter, the expanded laser beam is provided to the PBS 106.

The PBS 106, which is manufactured by repeatedly depositing at least two kinds of materials, each having a different refractive index, serves to penetrate one type of polarized laser beam, e.g., P-polarized beam, while reflecting the other type of polarized laser beam, e.g., S-polarized beam. Thus the PBS 106 divides the expanded laser beam into a penetrated laser beam (hereinafter, a signal beam) and a reflected laser beam (hereinafter, a reference beam) having different polarizations, respectively.

The signal beam, e.g., of a P-polarization, is fed to the polarizer 108, which removes imperfectly polarized components from the signal beam to thereby allow only the purely P-polarized component thereof to be transmitted therethrough. And then the signal beam with perfect or purified polarization is reflected by the mirror 110. Thereafter, the reflected signal beam is projected onto the hologram storage medium 120 via the mask 122. The mask 122, presenting data patterns for recording, functions as an input device, e.g., a spatial light modulator (SLM).

On the other hand, the reference beam is fed to the HWP 112. The HWP 112 converts the polarization of the reference beam such that it becomes identical to that of the signal beam. And then the reference beam is provided to the polarizer 114, wherein the polarization of the reference beam is further purified. And the reference beam of perfect or purified polarization is reflected by the mirrors 116 and 116'. Thereafter, the reference beam is projected onto the conical mirror 118 (the conical mirror 118 being of a circular cone having a circular base with a preset base angle between the circular base and the cone), which is fixed by a holder (not shown). As shown in FIG. 1B, the reference beam is reflected toward the hologram storage medium 120 by the conical mirror 118 in a conical beam shape. The incident angle of the reflected reference beam on the hologram storage medium 120 is determined by the base angle of the conical mirror 118.

The holder for fixing the conical mirror 118 is preferably installed on a bottom side of the conical mirror 118, in order to prevent the reference beam from being blocked by the holder. Since the holder is placed on the bottom side of the conical mirror 118, it is usually installed through a center opening 124 of the hologram storage medium 120.

The hologram storage medium 120 is a disk-shaped material for recording the data patterns. The disc-sized mask 122 provides the data patterns to be stored in the hologram storage medium 120. By illuminating the mask 122 with a normally incident plane wave, i.e., the signal beam, and by using the reference beam incident from an opposite side to record holograms in the reflection geometry, the diffracted pattern is recorded in the hologram storage medium 120. The conical beam shape is chosen to approximate the plane wave reference beam with a constant radial angle at all positions on the hologram storage medium 120, such that the holograms can be read locally by a fixed-angle narrow plane wave while the hologram storage medium 120 is rotating during playback. Furthermore, an angular multiplexing can be realized by using the conical mirror 118 with a different base angle (see "Holographic ROM system for high-speed replication", 2002 IEEE, by Ernest Chuang, et al.).

By using the above-mentioned scheme, the time required for producing a fully recorded 100 GB-order capacity disc may be reduced to less than a minute, and potentially to an order of seconds.

However, there are critical problems in the conventional holographic ROM system as follows:

First, the conventional holographic ROM system needs various conical mirrors, each having a different base angle and a different size for the angular multiplexing. However, it is seldom easy to manufacture conical mirrors, each having a new base angle and a new size. Even if these conical mirrors are manufactured, the conventional holographic ROM system suffers from the fact that each conical mirror should be fixed by employing inconveniently a different method depending on the new base angle and the new size of the corresponding conical mirror. Further, in order to replace one conical mirror with another conical mirror, a specific replacement method is required, wherein the method should take the base angles and the sizes of the two conical mirrors into consideration.

Further, since the reference beam is reflected by the conical mirror 118, a cone surface of the conical mirror 118 has to be coated uniformly. However, it is not easy to uniformly coat the cone surface of the conical mirror.

Most of all, gratings of the hologram storage medium 120 are closely formed, since an angle between the reflected reference beam and the signal beam at the hologram storage medium 120 is close to a right angle. When the gratings are closely formed, the amount of energy absorbed into the hologram storage medium 120 becomes large so that a reconstructed image may get dark and unclear. The conventional holographic ROM system has an excessively closed grating space, thereby dropping down the reading reliability of the reconstructed image.

SUMMARY OF THE INVENTION

It is, therefore, an object of the present invention to provide a holographic ROM system for enhancing a recording and reading efficiency by using a refractive material, wherein the refractive material is easily fixed and replaced for an angular multiplexing.

In accordance with a preferred embodiment of the present invention, there is provided a holographic system for storing data on an interference pattern in a hologram storage medium, which includes: a light source for emitting a laser beam; a beam splitter for dividing the laser beam into a reference beam and a signal beam; means for modulating the signal beam to generate a modulated signal beam; and a refractive material for refracting the reference beam to generate a refracted reference beam, wherein the refracted reference beam interferes with the modulated signal beam in the hologram storage medium to generate the interference pattern.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2:
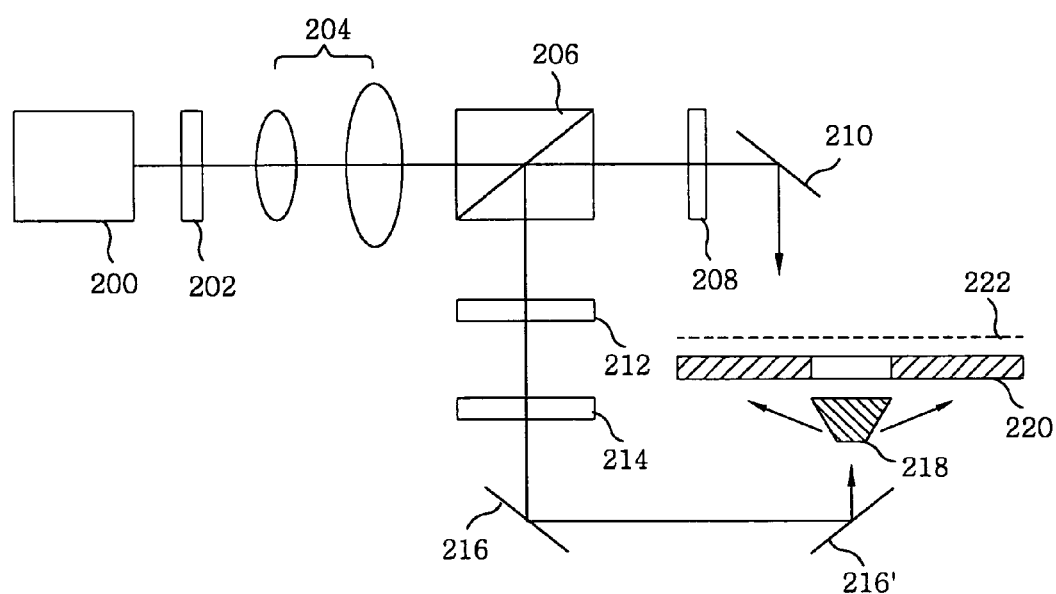
FIG. 2 offers a holographic ROM system in accordance with a preferred embodiment of the present invention.
Figure 3:
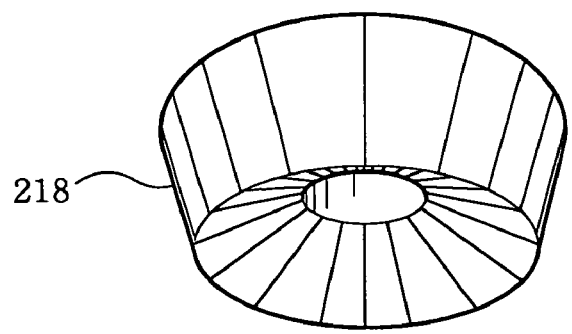
FIG. 3 illustrates a recording mechanism of the holographic ROM system shown in FIG. 2.

FIG. 2 shows a holographic ROM (Read-Only Memory) system in accordance with a preferred embodiment of the present invention and FIG. 3 represents a recording mechanism of the holographic ROM system shown in FIG. 2. The inventive holographic ROM system includes a light source 200, a first and a second half wave plate (HWP) 202 and 212, an expanding unit 204, a polarization beam splitter (PBS) 206, polarizers 208 and 214, mirrors 210, 216 and 216', a mask 222, a hologram storage medium 220 and a prism 218.

Figure 1A:
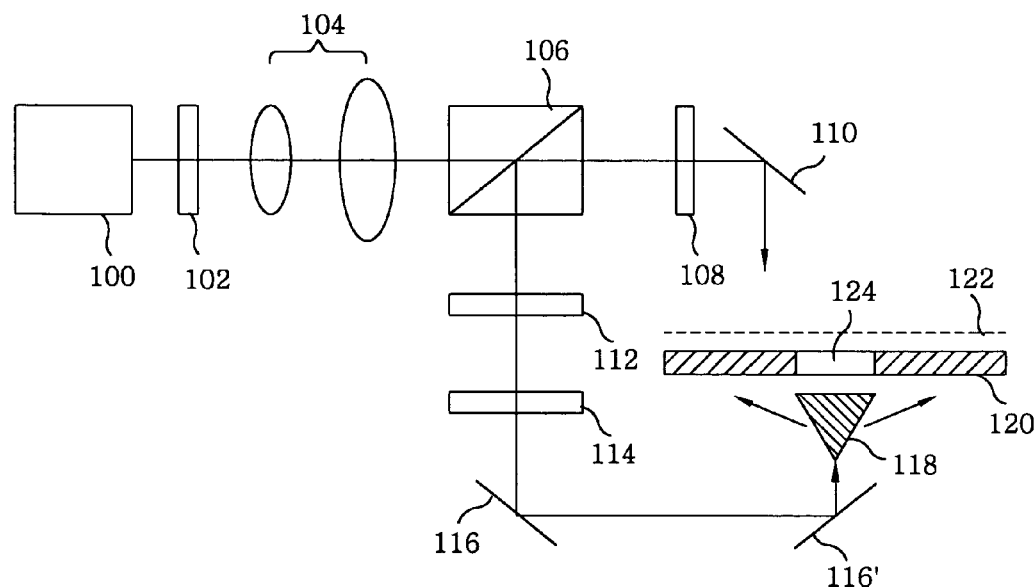
FIGS. 1A and 1B show a conventional holographic ROM system and a recording mechanism thereof.
Figure 1B:
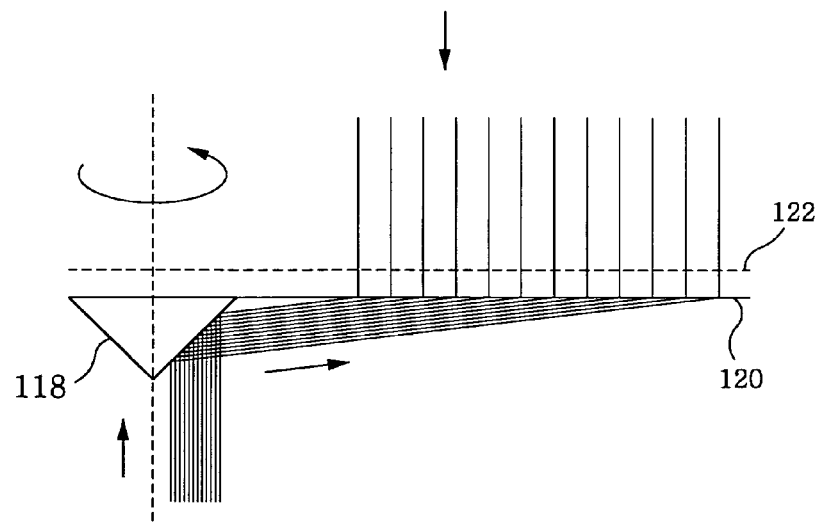

The structure of the inventive holographic ROM system is substantially identical to that of the conventional holographic ROM system shown in FIG. 1, excepting that the inventive holographic ROM system includes the prism 218 instead of the conical mirror 118.

A laser beam emitted from the light source 200 is provided to the PBS 206 via the HWP 202 and the expanding unit 204 and then is divided into a signal beam and a reference beam at the PBS 206. The signal beam passes through the polarizer 208, is reflected by the mirror 210 and then is modulated by the mask 222 to be provided to the hologram storage medium 220. The reference beam passes through the HWP 212, the polarizer 214, is reflected by the mirrors 216 and 216', and then is refracted at the prism 218. Thereafter, the refracted reference beam is conically dispersed onto the hologram storage medium 220 and interferes with the modulated signal beam, thereby producing an interference pattern.

The reference beam is refracted twice while passing through the prism 218 in accordance with Snell's law. To be more specific, the reference beam is firstly refracted as being projected into the prism 218 and then is refracted once more as being outputted from the prism 218.

Figure 4:
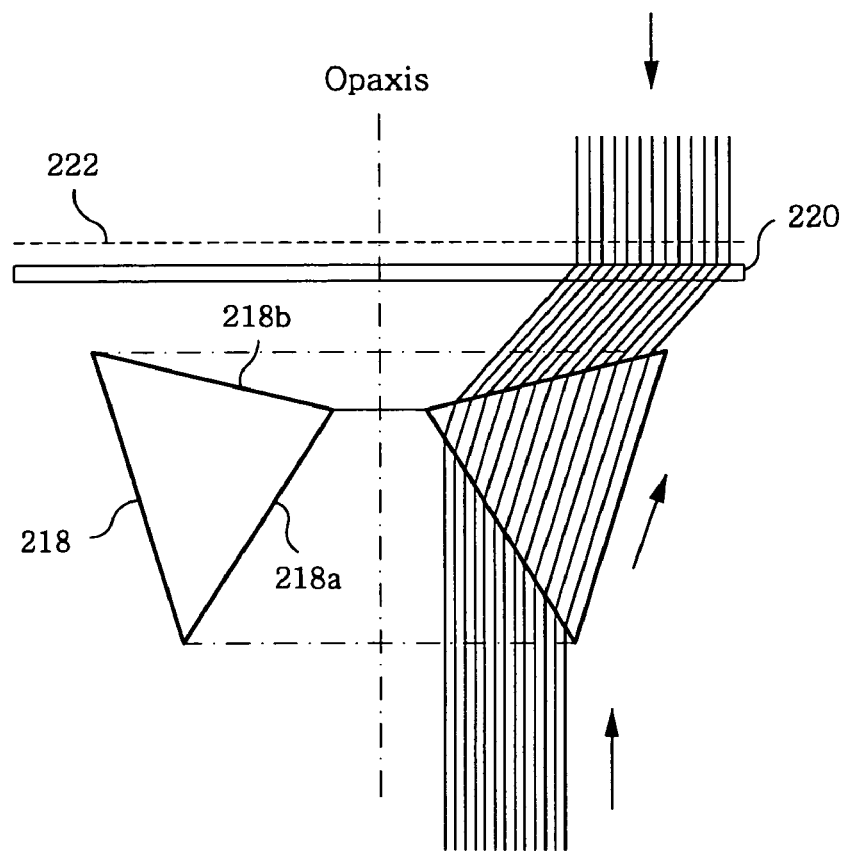
FIG. 4 is a perspective view of an inventive ring-shaped prism.

The prism 218 is a refractive material, i.e., an optical glass, which is made of PbO and $SiO_2$, of a ring shape as shown in FIG. 4.

The ring-shaped prism 218 is a truncated cone with an inner channel, wherein the inner channel is formed with an incident surface 218a and a project surface 218b, each of which is smooth-faced. The incident surface 218a is inclined about a symmetric axis Opaxis by a predetermined gradient and faces the mirror 216' while the projection surface 218b is inclined about Opaxis by a preset gradient and faces the hologram storage medium 220 as shown in FIG. 4. The reference beam is provided from the mirror 210 to the incident surface 218a and the refracted reference beam is outputted toward the hologram storage medium 220 from the projection surface 218b.

Thus optical path of the refracted reference beam depends on both a gradient of the projection surface 218b of the ring-shaped prism 218 and a refractive index of the ring-shaped prism 218.

The inventive holographic ROM system may include a plurality of ring-shaped prisms for an angular multiplexing, wherein each ring-shaped prism is same as the ring-shaped prism 218 excepting a gradient of its projection surface 218b. Therefore, each ring-shaped prism can be conveniently fixed by using a holder (not shown) and be simply replaced by a single replacement method.

Figure 5:
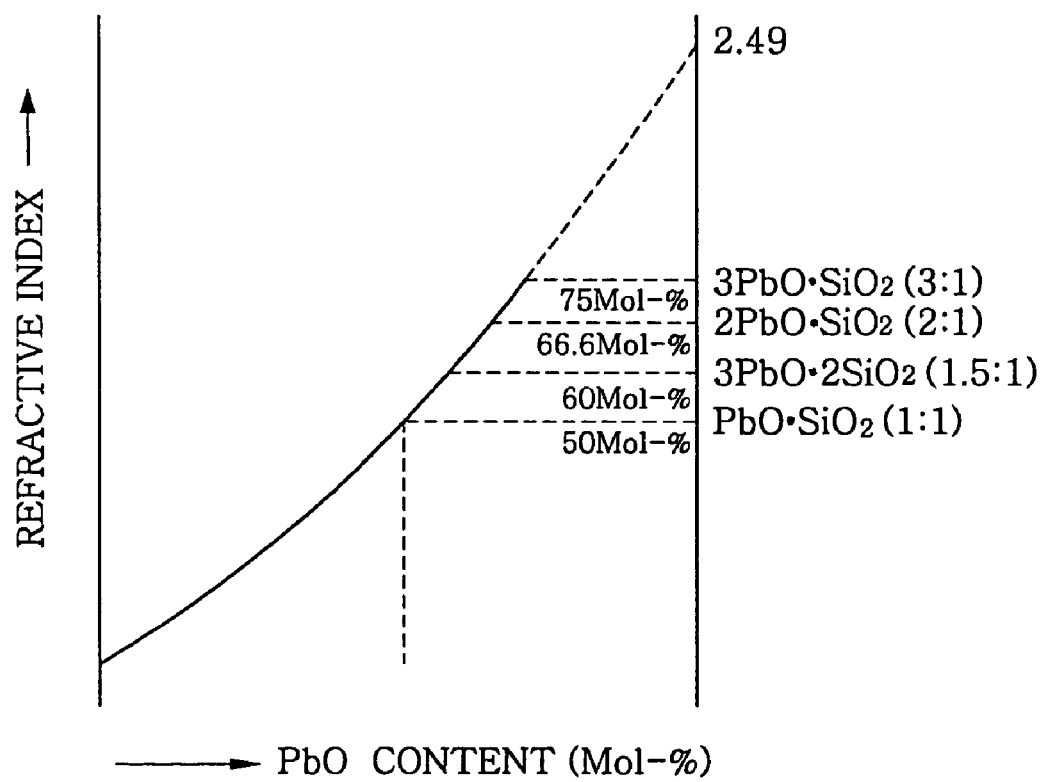
FIG. 5 depicts a graph for illustrating a refractive index depending on PbO content.

Meanwhile, the optical path of the refracted reference beam also depends on a refractive index of the ring-shaped prism 218. The refractive index of the ring-shaped prism 218 depends on PbO content as shown in FIG. 5. That is, the inventive holographic ROM system may achieve the angular multiplexing by changing the refractive index of the ring-shaped prism 218, without changing the gradient of the projection surface 218b of the ring-shaped prism 218, and further, is able to conveniently fix each ring-shaped prism by using a holder (not shown) and simply replace one ring-shape prism with another by a single replacement method, since each ring-shaped prism has different refractive index but same shape.

In accordance with the present invention, an angle between the refracted reference beam and the modulated signal beam at the hologram storage medium 220 is close not to a right angle but to a straight angle, thereby reconstructing an image with a high resolution. That is, the inventive holographic ROM system has a reading reliability higher than that of the conventional holographic ROM system.

Meanwhile, a front shape of the ring-shaped prism 218 has been assumed to be a trapezoid as shown in the FIGS. 2 to 4, but it may be a square, a rectangle, and the like.

In case of altering not a refractive index of the ring-shaped prism 218 but a gradient of the projection surface 218*b* of the ring-shaped prism 218, the ring-shaped prism 218 may be made by adding $Na_2O$ instead of PbO to $SiO_2$.

While the invention has been shown and described with respect to the preferred embodiments, it will be understood by those skilled in the art that various changes and modifications may be made without departing from the spirit and the scope of the invention as defined in the following claims.

What is claimed is:

1. A holographic system for storing data on an interference pattern in a hologram storage medium, which comprises:
    a light source for emitting a laser beam;
    a beam splitter for dividing the laser beam into a reference beam and a signal beam;
    means for modulating the signal beam to generate a modulated signal beam; and
    a refractive material for refracting the reference beam to generate a refracted reference beam, wherein the refracted reference beam interferes with the modulated signal beam in the hologram storage medium to generate the interference pattern,
    wherein the refractive material is a ring-shaped prism for conically dispersing the refracted reference beam on the hologram storage medium, the ring-shaped prism being a truncated cone including in an inner channel formed therein, the inner channel having a first refractive surface to which the reference beam is provided and a second refractive surface from which the reference beam is outputted.

2. The system of claim 1, wherein an optical path of the refracted reference beam depends on a refractive index of the refractive material.

3. The system of claim 2, wherein the refractive material is made of $PbO—SiO_2$.

4. The system of claim 3, wherein the refractive index of the refractive material depends on PbO content in $PbO—SiO_2$.

5. The system of claim 1, wherein the first refractive surface is at an angle to the reference beam incident thereupon and the second refractive surface is at an angle to the reference beam transmitted with the angle being other than at 90°.

* * * * *